United States Patent
Yang

(10) Patent No.: US 9,958,073 B2
(45) Date of Patent: May 1, 2018

(54) THROTTLE VALVE

(71) Applicant: Vanguard International Semiconductor Corporation, Hsinchu (TW)

(72) Inventor: Reunn-Chang Yang, Kaohsiung City (TW)

(73) Assignee: VANGUARD INTERNATIONAL SEMICONDUCTOR CORPORATION, Hsinchu (TW)

( * ) Notice: Subject to any disclaimer, the term of this patent is extended or adjusted under 35 U.S.C. 154(b) by 77 days.

(21) Appl. No.: 15/184,456

(22) Filed: Jun. 16, 2016

(65) Prior Publication Data

US 2017/0363215 A1   Dec. 21, 2017

(51) Int. Cl.
*F16K 5/08* (2006.01)
*F16K 5/04* (2006.01)

(52) U.S. Cl.
CPC .............. *F16K 5/08* (2013.01); *F16K 5/0407* (2013.01); *F16K 5/0464* (2013.01)

(58) Field of Classification Search
CPC . F16K 5/22; F16K 5/222; F16K 5/225; F16K 5/227; F16K 5/04; F16K 5/0407; F16K 5/0605; F16K 25/00; F16K 25/04; F16K 29/00; Y10T 137/4245; Y10T 137/4238; Y10T 137/4273; Y10T 137/428; Y10T 137/4287; Y10T 137/0435
USPC .................... 137/237, 238, 242, 243, 243.1; 251/205–209, 309, 369
See application file for complete search history.

(56) References Cited

U.S. PATENT DOCUMENTS

| | | | | |
|---|---|---|---|---|
| 2,045,113 | A * | 6/1936 | Ward | F16K 5/162 137/242 |
| 3,314,643 | A * | 4/1967 | Sachnik | F16K 5/0407 251/309 |
| 4,937,907 | A * | 7/1990 | Antal | F28G 1/12 15/104.061 |
| 5,706,851 | A * | 1/1998 | Lopez-Gomez | F16K 5/0407 137/246.22 |
| 6,090,206 | A * | 7/2000 | Bang | F16K 5/12 118/715 |

FOREIGN PATENT DOCUMENTS

| | | |
|---|---|---|
| CN | 204004514 U | 12/2014 |
| TW | 369111 | 9/1999 |
| TW | M307708 | 3/2007 |
| TW | M496641 U | 3/2015 |

* cited by examiner

*Primary Examiner* — Matthew W Jellett
(74) *Attorney, Agent, or Firm* — Birch, Stewart, Kolasch & Birch, LLP

(57) ABSTRACT

A throttle valve is provided. The throttle valve includes a throttle valve body, a valve plug, a hollow seal and a first scraper. A flow path is formed in the throttle valve body. The valve plug is disposed in the throttle valve body. A notch is formed on the valve plug. By rotating the valve plug, the position of the notch is changed, and the degree of opening of the flow path is modified. The hollow seal is disposed in the throttle valve body. An abutting portion is formed on the hollow seal, and the abutting portion sealably abuts the valve plug. The first scraper is disposed on the valve plug. When the valve plug is rotated, the first scraper abuts the abutting portion to clean the abutting portion.

9 Claims, 6 Drawing Sheets

THROTTLE VALVE

BACKGROUND OF THE INVENTION

Field of the Invention

The present invention relates to a throttle valve, and in particular to a throttle valve prevented from being polluted by particles.

Description of the Related Art

The process of depositing layers on a semiconductor Wafer (or substrate) usually involves heating the substrate and holding it a short distance from the source of a stream of deposition (or process) gas flowing towards the substrate. The flowing gas reacts and deposits a layer on the heated substrate.

At some point in the vacuum line between the chamber and the vacuum pump, a vacuum shut-off or throttle valve is typically provided which when closed acts as a limit of the process chamber containment. Volatile contaminants which are maintained in their vapor state under the high temperatures of an active processing chamber can and do undesirably condense on the walls of the cool vacuum piping at some distance from the processing area of the processing chamber, but still within the containment limit of the processing chamber defined by the vacuum valve. During no-flow conditions, these contaminants can migrate back into the processing part of the chamber to undesirably contribute to its contamination. In an attempt to avoid this problem, the inside surfaces within the containment limit of the processing chamber are periodically cleaned by etching (and/or plasma cleaning) these surfaces with a cleaning gas to remove the dielectric material deposited by the deposition gas. Optimization involves extending the time between cleanings as much as possible without introducing defects. Cleaning interferes with normal production processing.

However, pollution in the form of particulate matter is usually deposited on the inner elements of the throttle valve, and this decreases the ability of the throttle valve to effectively control the air flow. Such throttle valves are commonly controlled by a stepper motor. When the particle pollution is deposited on the inner elements of the throttle valve, the stepper motor repeatedly modifies the degree of opening of the throttle valve, causing the pressure within the processing chamber to be unstable, and the lifetime of the throttle valve to decrease.

BRIEF SUMMARY OF THE INVENTION

In one embodiment, a throttle valve is provided. The throttle valve includes a throttle valve body, a valve plug, a hollow seal and a first scraper. A flow path is formed in the throttle valve body. The valve plug is disposed in the throttle valve body. A notch is formed on the valve plug. By rotating the valve plug, the position of the notch is changed, and the degree of opening of the flow path is modified. The hollow seal is disposed in the throttle valve body. An abutting portion is formed on the hollow seal, and the abutting portion sealably abuts the valve plug. The first scraper is disposed on the valve plug. When the valve plug is rotated, the first scraper abuts the abutting portion to clean the abutting portion.

In embodiment, the first scraper corresponds to the notch.

In one embodiment, an included angle between the first scraper and a central plane of symmetry of the valve plug is 45 degrees.

In one embodiment, the throttle valve further comprises a second scraper, wherein the second scraper corresponds to the notch, and the first scraper is symmetric to the second scraper relative of the central plane of symmetry.

In one embodiment, an included angle between the first scraper and the central plane of symmetry of the valve plug is 45 degrees, and an included angle between the second scraper and the central plane of symmetry of the valve plug is −45 degrees.

In one embodiment, the first scraper is a metal wire.

In one embodiment, two ends of the first scraper are embedded to the valve plug, and are located in two sides of the notch.

In one embodiment, the first scraper extends parallel to a central axis of the valve plug.

In one embodiment, the throttle valve body comprises an inlet and an outlet, the inlet and the outlet are located on a straight line, and the hollow seal is located between the outlet and the valve plug.

In one embodiment, the throttle valve body comprises a body inner wall, and when the plug valve is rotated, the first scraper contacts the body inner wall and cleans the body inner wall.

Utilizing the throttle valve of the first embodiment of the invention, the first scraper cleans the hollow seal and the body inner wall of the throttle valve body. Therefore, the particles are prevented from being deposited on the hollow seal and the body inner wall. The flow path of the throttle valve would not be barricaded by the particle deposition, and the degree of opening of the throttle valve is prevented from repeatedly being modified. The stability of the pressure of the processing chamber is improved, and the lifetime of the throttle valve is increased.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
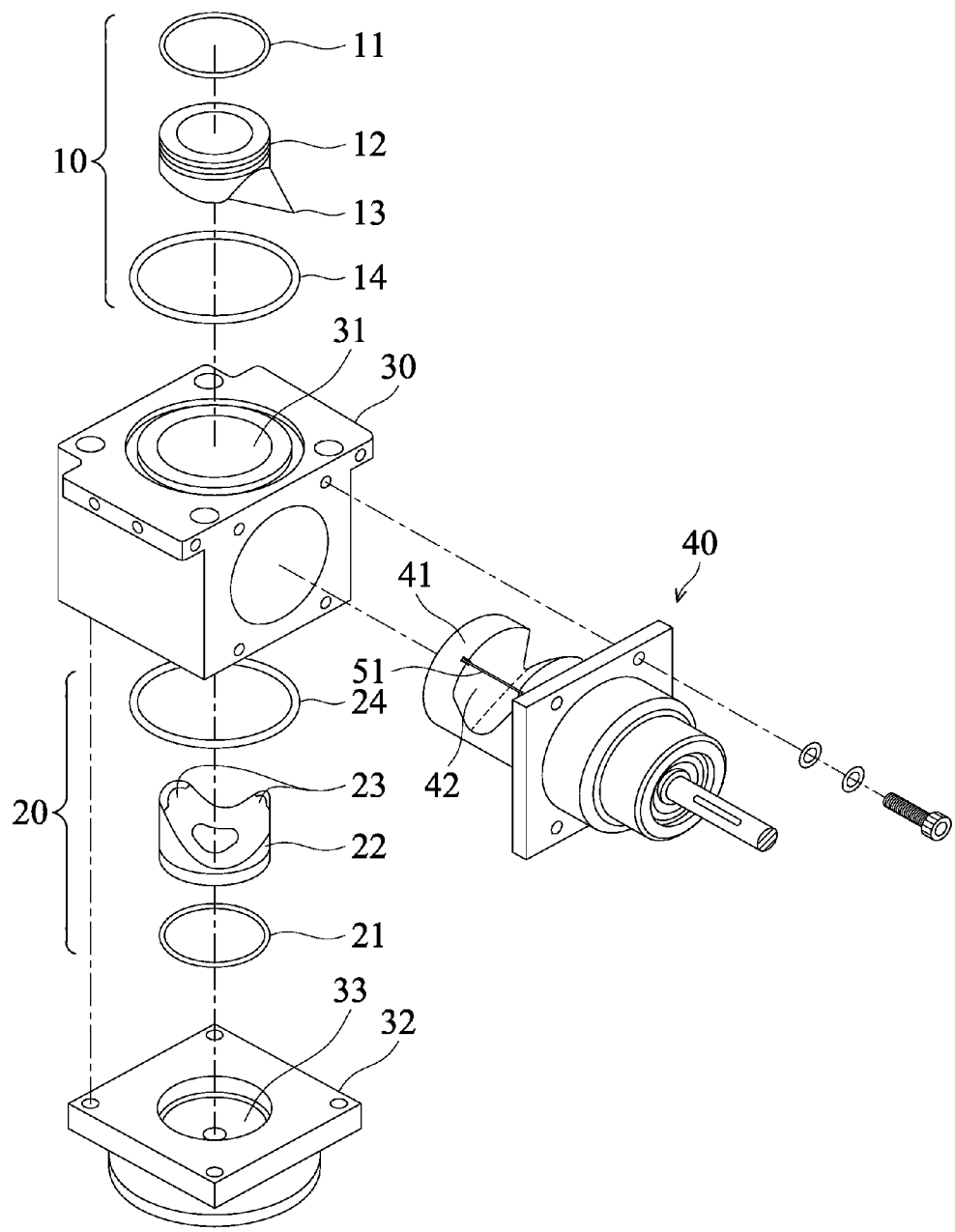
FIG. 1 shows the throttle valve of the first embodiment of the invention.

FIG. 1 shows a throttle valve 1 of a first embodiment of the invention. The throttle valve 1 includes a first connection unit 10, a second connection unit 20, a throttle valve body 30, a valve plug unit 40, and a first scraper 51. The first connection unit 10 comprises an O-ring 11, a hollow seal 12 and an O-ring 14. The second connection unit 20 comprises an O-ring 21, a hollow seal 22 and an O-ring 24. The throttle valve body 30 comprises an inlet 31. The valve plug unit 40 comprises a valve plug 41, and a notch 42 is formed on the valve plug 41. The throttle valve body 30 comprises a cover 32, and an outlet 33 is formed on the cover 32. The first scraper 51 is disposed on the valve plug 41.

With reference to FIG. 1, a flow path is formed in the throttle valve body 30 (from the inlet 31 to the outlet 33). In the embodiment, the flow path is straight, and the inlet 31 and the outlet 51 are located on the same straight line. The valve plug 41 is disposed in the throttle valve body 30. By rotating the valve plug 41, the position of the notch 42 is changed, and the degree of opening of the flow path is modified. The O-ring 11 is disposed between the hollow seal 12 and an external pipe (not shown). The O-ring 14 is disposed between the throttle valve body 30 and the external pipe (not shown). The O-ring 21 is disposed between the hollow seal 22 and the cover 32. The O-ring 24 is disposed between the throttle valve body 30 and the cover 32.

With reference to FIG. 1, the hollow seal 12 comprises an abutting portion 13. The abutting portion 13 has a concave part and a convex part. The abutting portion 13 sealably abuts the valve plug 41. Similarly, the hollow seal 22 comprises an abutting portion 23. The abutting portion 23 has a concave part and a convex part. The abutting portion 23 sealably abuts the valve plug 41. In this embodiment, when the valve plug 41 is rotated, the first scraper 51 contacts the abutting portion 23 and cleans the abutting portion 23.

Figure 2A:
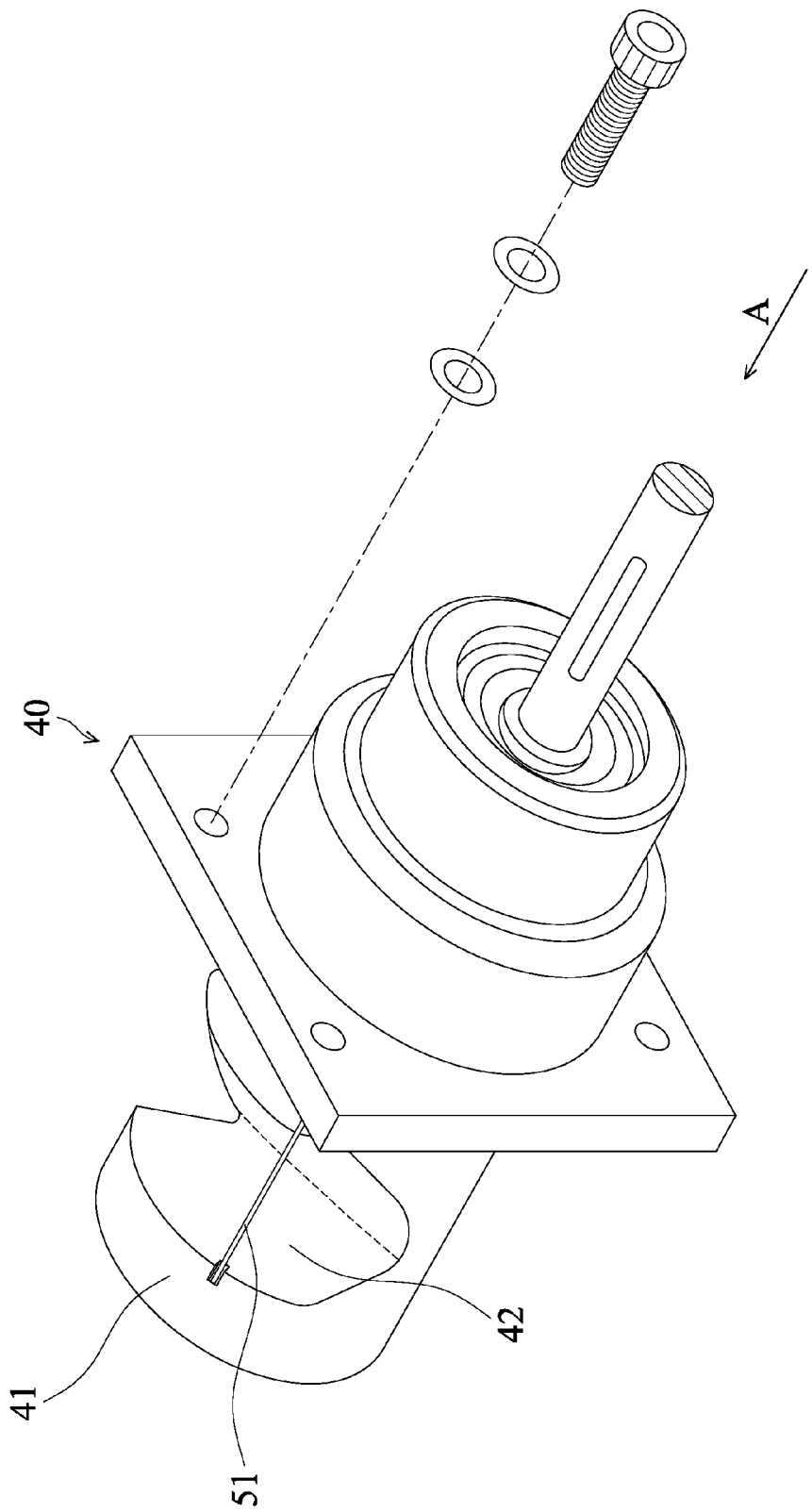
FIG. 2A shows the detailed structure of the first scraper of the first embodiment of the invention.
Figure 2B:
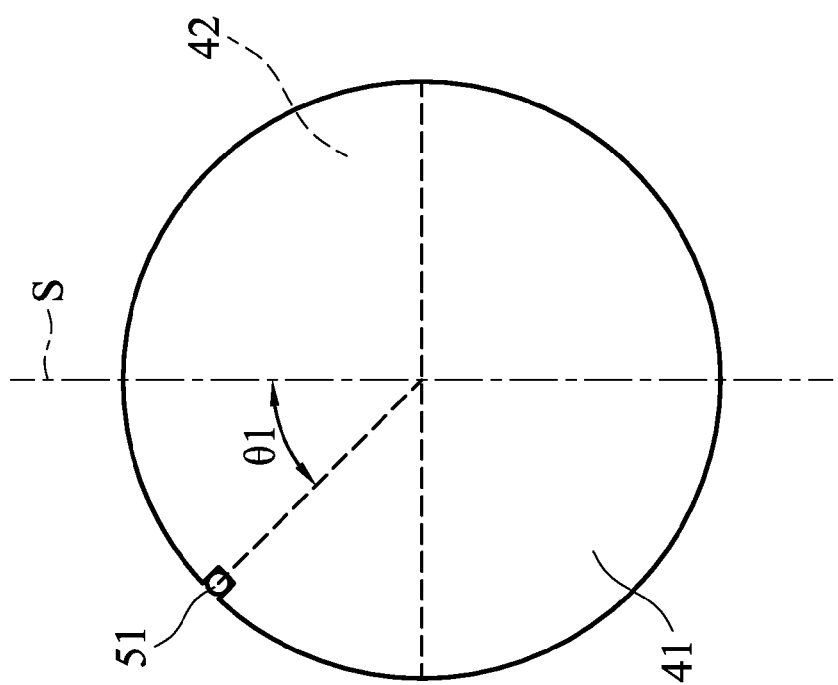
FIG. 2B shows the detailed position of the first scraper of the first embodiment of the invention.

With reference to FIG. 2A, the first scraper 51 corresponds to the notch 42. With reference to FIG. 2B, an included angle θ1 between the first scraper 51 and a central plane S of symmetry of the valve plug 41 is 45 degrees.

With reference to FIG. 2A, in one embodiment, the first scraper 51 is a metal wire. The two ends of the first scraper 51 are embedded to the valve plug 41, and are located in two sides of the notch 42. In other words, the first scraper 51 crosses the notch 42. The first scraper 51 extends parallel to a central axis A of the valve plug 41.

In one embodiment, the throttle valve body 30 comprises a body inner wall (not shown). When the plug valve is rotated, the first scraper 51 contacts the body inner wall and cleans the body inner wall.

Utilizing the throttle valve of the first embodiment of the invention, the first scraper cleans the hollow seal and the body inner wall of the throttle valve body. Therefore, the particles are prevented from being deposited on the hollow seal and the body inner wall. The flow path of the throttle valve would not be barricaded by the particle deposition, and the degree of opening of the throttle valve is prevented from repeatedly being modified. The stability of the pressure of the processing chamber is improved, and the lifetime of the throttle valve is increased.

Figure 3:
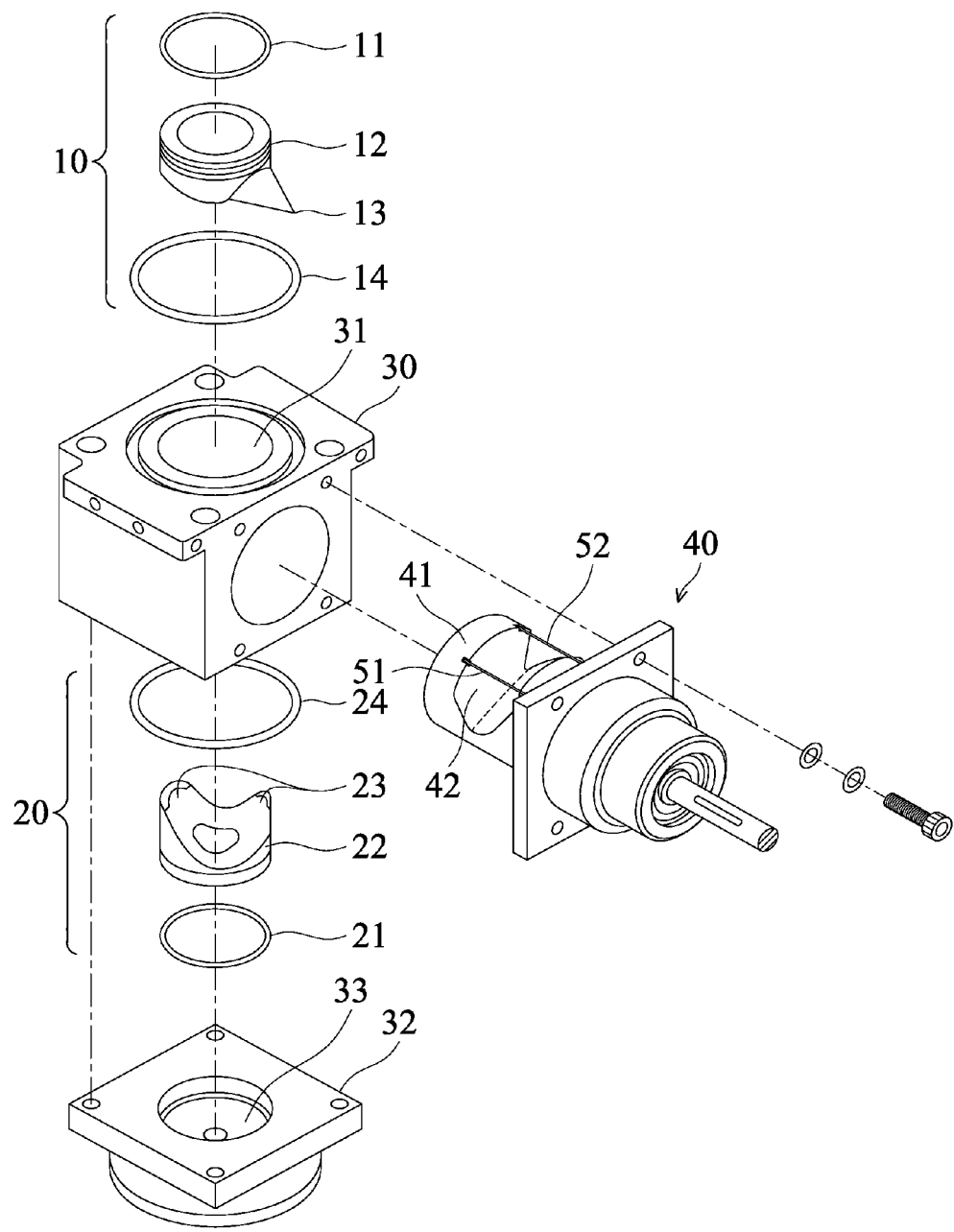
FIG. 3 shows the throttle valve of the second embodiment of the invention.

FIG. 3 shows a throttle valve 2 of a second embodiment of the invention. The throttle valve 1 includes a first connection unit 10, a second connection unit 20, a throttle valve body 30, a valve plug unit 40, a first scraper 51 and a second scraper 52. The first connection unit 10 comprises an O-ring 11, a hollow seal 12 and an O-ring 14. The second connection unit 20 comprises an O-ring 21, a hollow seal 22 and an O-ring 24. The throttle valve body 30 comprises an inlet 31. The valve plug unit 40 comprises a valve plug 41, and a notch 42 is formed on the valve plug 41. The throttle valve body 30 comprises a cover 32, and an outlet 33 is formed on the cover 32. The first scraper 51 is disposed on the valve plug 41. The second scraper 52 is disposed on the valve plug 41.

With reference to FIG. 3, a flow path is formed in the throttle valve body 30 (from the inlet 31 to the outlet 33). In the embodiment, the flow path is straight, and the inlet 31 and the outlet 51 are located on the same straight line. The valve plug 41 is disposed in the throttle valve body 30. By rotating the valve plug 41, the position of the notch 42 is changed, and the degree of opening of the flow path is modified. The O-ring 11 is disposed between the hollow seal 12 and an external pipe (not shown). The O-ring 14 is disposed between the throttle valve body 30 and the external pipe (not shown). The O-ring 21 is disposed between the hollow seal 22 and the cover 32. The O-ring 24 is disposed between the throttle valve body 30 and the cover 32.

With reference to FIG. 3, the hollow seal 12 comprises an abutting portion 13. The abutting portion 13 has a concave part and a convex part. The abutting portion 13 sealably abuts the valve plug 41. Similarly, the hollow seal 22 comprises an abutting portion 23. The abutting portion 23 has a concave part and a convex part. The abutting portion 23 sealably abuts the valve plug 41. In this embodiment, when the valve plug 41 is rotated, the first scraper 51 and the second scraper 52 contact the abutting portion 23 and clean the abutting portion 23.

Figure 4A:
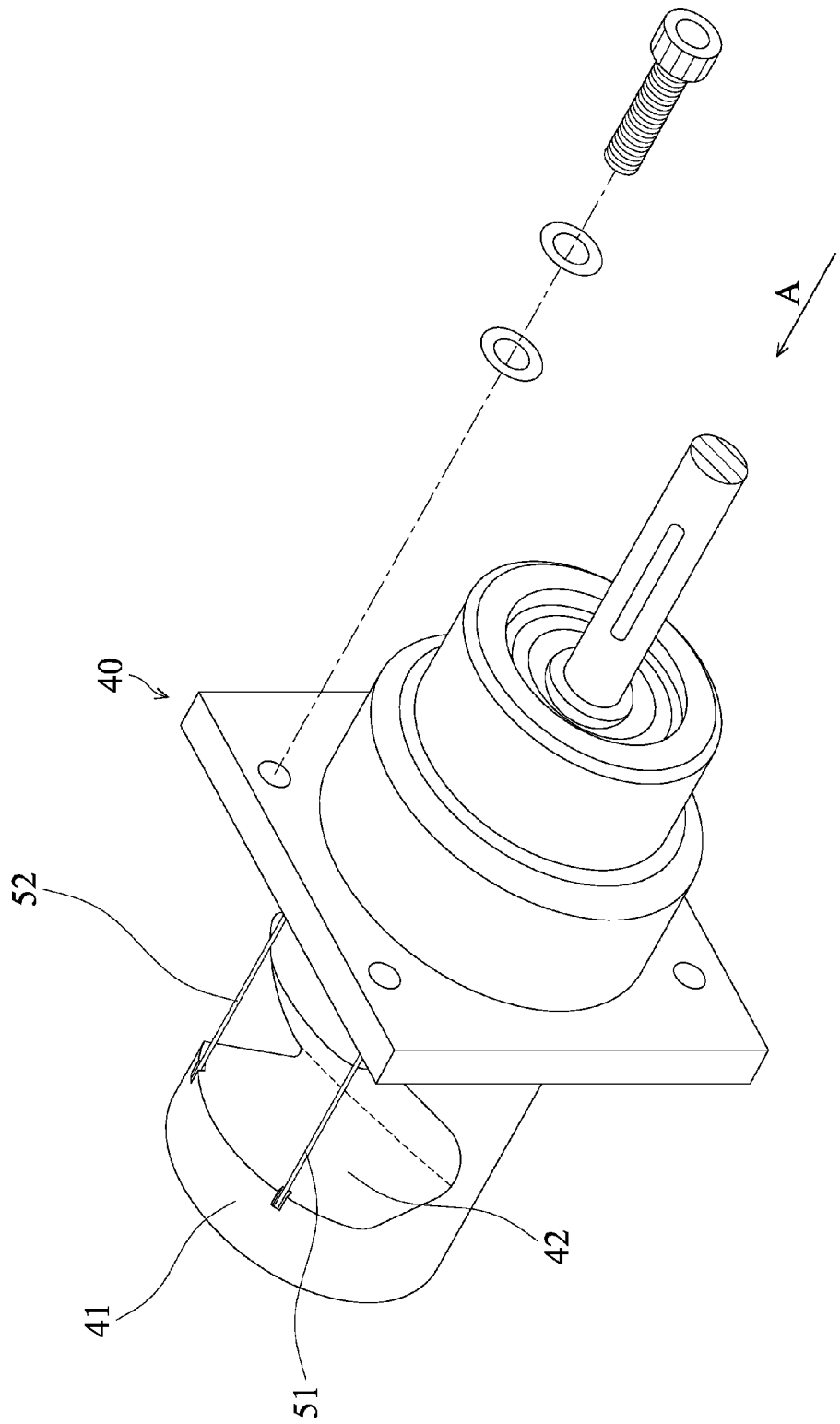
FIG. 4A shows the detailed structure of the first and second scrapers of the second embodiment of the invention.
Figure 4B:
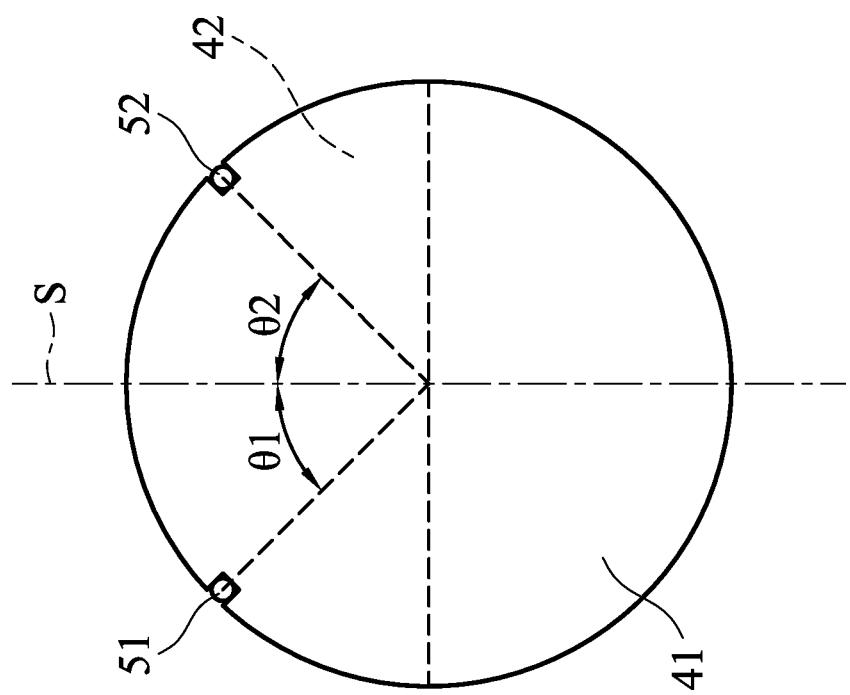
FIG. 4B shows the detailed position of the first and second scrapers of the second embodiment of the invention.

With reference to FIG. 4A, the first scraper 51 corresponds to the notch 42, and the second scraper 52 corresponds to the notch 42. With reference to FIG. 4B, an included angle θ1 between the first scraper 51 and a central plane S of symmetry of the valve plug 41 is 45 degrees, and an included angle θ2 between the second scraper 52 and the central plane S of symmetry of the valve plug 41 is −45 degrees. In other words, the first scraper 51 is symmetric to the second scraper 52 relative of the central plane S of symmetry of the valve plug 41.

With reference to FIG. 4A, in one embodiment, the first scraper 51 is a metal wire, and the second scraper 52 is a metal wire. The two ends of the first scraper 51 are embedded to the valve plug 41, and are located in two sides of the notch 42. The two ends of the second scraper 52 are embedded to the valve plug 41, and are located in two sides of the notch 42. In other words, the first scraper 51 and the second scraper 52 cross the notch 42. The first scraper 51 and the second scraper 52 extend parallel to a central axis A of the valve plug 41.

Similar to the first embodiment, in one embodiment, the throttle valve body 30 comprises a body inner wall (not shown). When the plug valve is rotated, the first scraper 51 and the second scraper 52 contact the body inner wall and clean the body inner wall.

Utilizing the throttle valve of the second embodiment of the invention, the second scraper is added to clean the hollow seal and the body inner wall of the throttle valve body. The particle deposition escaped from the first scraper would still be removed by the second scraper. Therefore, the particles are prevented from being deposited on the hollow seal and the body inner wall. The flow path of the throttle valve would not be barricaded by the particle deposition, and the degree of opening of the throttle valve is prevented from repeatedly being modified. The stability of the pressure of the processing chamber is improved, and the lifetime of the throttle valve is increased.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A throttle valve, comprising:
    a throttle valve body, wherein a flow path is formed in the throttle valve body;
    a valve plug, disposed in the throttle valve body, wherein a notch is formed on the valve plug, and by rotating the valve plug, a position of the notch is changed, and a degree of opening of the flow path is modified
    a hollow seal, disposed in the throttle valve body, wherein an abutting portion is formed on the hollow seal, and the abutting portion sealably abuts the valve plug; and
    a first scraper, disposed on the valve plug, wherein when the valve plug is rotated, the first scraper abuts the abutting portion to clean the abutting portion, wherein the first scraper is suspended above and across the notch.

2. The throttle valve as claimed in claim 1, wherein an included angle between the first scraper and a central plane of symmetry of the valve plug is 45 degrees.

3. The throttle valve as claimed in claim 1, further comprising a second scraper, wherein the second scraper is suspended above and across the notch, and the first scraper is symmetric to the second scraper relative of the central plane of symmetry.

4. The throttle valve as claimed in claim 3, wherein an included angle between the first scraper and the central plane of symmetry of the valve plug is 45 degrees, and an included angle between the second scraper and the central plane of symmetry of the valve plug is −45 degrees.

5. The throttle valve as claimed in claim 1, wherein the first scraper is a straight metal wire.

6. The throttle valve as claimed in claim 5, wherein two ends of the first scraper are embedded to the valve plug, and are respectively located on two opposite sides of the notch.

7. The throttle valve as claimed in claim 6, wherein the first scraper extends parallel to a central axis of the valve plug.

8. The throttle valve as claimed in claim 1, wherein the throttle valve body comprises an inlet and an outlet, the inlet and the outlet are located on a straight line, and the hollow seal is located between outlet and the valve plug.

9. The throttle valve as claimed in claim 1, wherein the throttle valve body comprises a body inner wall, and when the plug valve is rotated, the first scraper contacts the body inner wall and cleans the body inner wall.

* * * * *